Figure 1:
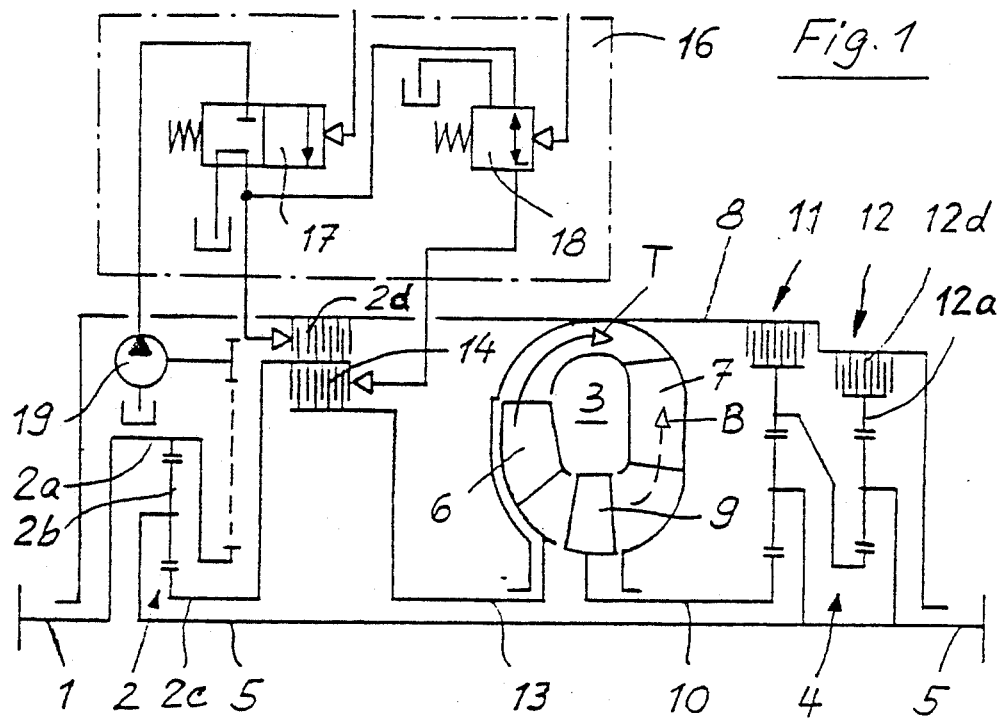

United States Patent [19]

Rohne et al.

[11] Patent Number: 4,819,509
[45] Date of Patent: Apr. 11, 1989

[54] HYDRODYNAMIC-MECHANICAL TRANSMISSION

[75] Inventors: Elmar Rohne; Gottfried Ruetz, both of Heidenheim, Fed. Rep. of Germany

[73] Assignee: J. M. Voith GmbH, Heidenheim, Fed. Rep. of Germany

[21] Appl. No.: 81,469

[22] Filed: Aug. 4, 1987

[30] Foreign Application Priority Data

Aug. 12, 1986 [DE] Fed. Rep. of Germany ....... 3627370

[51] Int. Cl.$^4$ .............................................. F16H 47/08
[52] U.S. Cl. ........................................ 74/688; 74/732; 192/3.24
[58] Field of Search ................ 74/688, 730, 731, 732; 192/3.21, 3.23, 3.24, 3.25, 3.26, 3.33

[56] References Cited

U.S. PATENT DOCUMENTS

| | | | |
|---|---|---|---|
| 3,285,100 | 11/1966 | Peltner et al. | 74/688 |
| 3,749,209 | 7/1973 | Weinrich et al. | 74/688 X |
| 3,948,367 | 4/1976 | Weinrich et al. | 192/3.33 |
| 4,066,157 | 1/1978 | Gibbs | 192/3.24 |
| 4,077,502 | 3/1978 | Nitsche et al. | 192/3.23 X |
| 4,099,426 | 7/1978 | Keller et al. | 74/730 |

FOREIGN PATENT DOCUMENTS 925221 8/1947 France ............................. 192/3.23

Primary Examiner—Dwight G. Diehl

[57] ABSTRACT

The braking force of a transmission and more especially the transmission of a motor vehicle, in which the torque converter component is used for braking by counter rotation of the turbine may be increased if the pump is not able to rotate freely during braking operation in the direction of rotation caused by the flow circuit in the circuit and is instead kept running at a preselectable speed or speed ratios between the turbine and the pump. In this respect a suitable member is preferably a torque converter with a turbine which is arranged on the radially inner part of the torque converter cross section and through which the flow is axial, its direction of rotation during traction operation being opposite to that of the pump.

18 Claims, 1 Drawing Sheet

HYDRODYNAMIC-MECHANICAL TRANSMISSION

The invention relates to a hydrodynamic mechanical transmission, preferably for motor vehicles, and, in particular, a hydrodynamic mechanical torque converter. It is more especially in the case of automatic transmissions for vehicles which have to frequently start and stop, that is to say omnibuses or other commercial vehicles, that torque converters may be successfully employed which may be used to start from standstill with little wear and to brake the vehicle.

Such a hydrodynamic mechanical transmission has been proposed in the German Pat. No. 2,021,543 (corresponding to the U.S. Pat. No. 3,749,209), with a torque converter whose turbine is provided which has a reversing device incorporating epicyclic gearing for reversing the direction of rotation for the purpose of braking. Furthermore possibilites are shown for chaning over between traction and braking operation in a rapid but nevertheless smooth manner.

The German Pat. No. 2,537,431 (corresponding to the U.S. Pat. No. 4,099,426) further describes a transmission, more especially for use in earth-moving machinery, in which there is at least one torque converter for each direction of travel. The pumps of all the torque converters of the transmission are connected with the prime mover and are driven in the same direction. The turbines rotate partly in opposite directions.

During operation the pump and the turbine of at least one torque converter will accordingly be rotating in opposite directions. The torque converters are put into and taken out of operation by filling and emptying them with the functional fluid. If the functional fluid is introduced into one torque converter whose turbine is oppositely rotating at the instant, a braking force will be developed by the turbine, which may be varied by the prime mover via the speed of rotation of the respective pump.

The German Pat. No. 2,518,186 (corresponding to the U.S. Pat. No. 4,077,502) describes a hydrodynamic mechanical vehicle transmission with a torque converter, whose turbine during the traction rotates in the opposite direction to the pump. The patent states that the characteristic of this type of torque converter means that it may be advantageously used for hydrodynamic braking with the pump rotating, the speed of rotation of the pump depending on the slip of the input friction clutch. This torque converter characteristic means that the input clutch of the said type of hydrodynamic braking is only subject to a very low load.

Known transmissions with the torque converters used for braking have proved successful. The braking force developed by the torque converter in accordance with the German Pat. No. 2,021,543 is however not satisfactory for all applications owing to the dimensions of the torque converter which are limited because of the transmission. The increase in the braking force of the torque converter in accordance with the German Pat. No. 2,537,431 due to increased pump speed is obtained at the sacrifice of an uneconomic consumption of power from the prime mover.

One object of the present invention is to increase the braking force of a torque converter connected with a transmission and whose turbine is counter-rotated for the purpose of braking without this involving an impairment in the economy of the transmission as a whole.

This object is fulfilled by employing an arrangement which during braking causes a controlled rotational motion of the pump of the torque converter opposite to the rotation during traction.

The pumps in the system of the German Pat. No. 2,537,431 remain connected with the pump mover even during braking and always rotate together. Owing to the input of power involved with such parallel operation of two pumps it is mandatory to empty the torque converter which is not in operation, although even the air therein itself even absorbs a certain amount of the power. Damage through heating of the torque converter caused by air ventilation in the emptied condition is in this case precluded by closing the stator blades which are designed so that they may be set.

On the other hand the torque converter in accordance with the German Pat. No. 2,021,543 remains filled at all times. On switching over to purely mechanical traction operation, the pump of the torque converter is braked till it ceases to rotate. On braking as well the pump is halted, while the turbine operates as a pump. Then the pump assumes the function of a stator and controls the supply of flowing fluid to the turbine and thus the degree of the braking force, the circulation of the operating fluid within the torque converter being opposite to its direction during traction. The vanes of the pump are however designed to be most effective during traction operation and for the flow direction thereof only. Thus this known torque converter is not able to provide fully satisfactory braking features. Braking tests made with the pump in the uncoupled state led to failure for this reason, since it was found that the uncoupling of the pump brake involving a completely free movement of the pump led to instable flow events in the torque converter. The consequence of this is a complete breakdown of the braking action of the turbine.

However we have now been able to see that the braking force of the turbine may be increased if steps are taken to see that during hydrodynamic mechanical braking, in a manner different to that in the German Pat. No. 2,518,186, it is not only the turbine but the pump as well which rotate in reverse, i.e. in the direction opposite to that during traction. Then the reversal of the direction of rotation may be brought about hydraulically, for example 4 (at the inception of braking) by reversing the direction of rotation of the turbine and by the resulting reversal of the circulation of the operating fluid in the torque converter; in other words, the pump now operates as a turbine. In this respect it is however important not to completely halt the pump, upon which the braking force of the turbine depends. Another possibility is described in the following description of embodiments of the invention.

Figure 2:
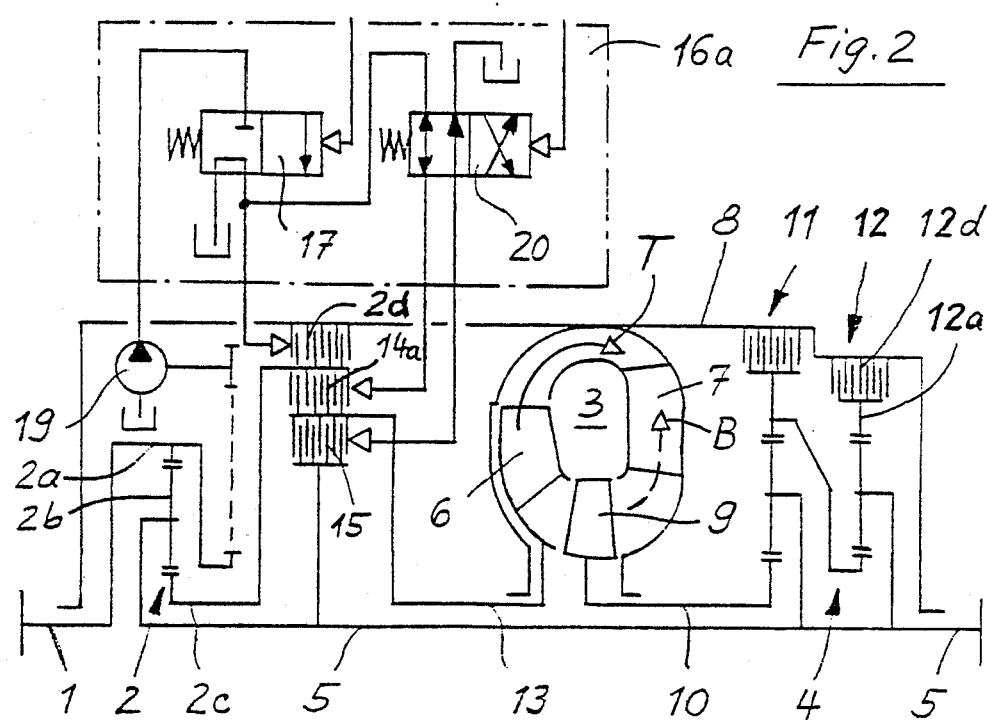

FIGS. 1 and 2 show two different working embodiments, each in the form of diagrammatic longitudinal sections.

In the figures like parts are denoted by like reference numerals.

FIG. 1 shows a transmission to be driven by a prime mover that is not shown. The transmission comprises an input drive shaft 1, a differential gear unit 2 of known design, a torque converter 3 and an output transmission 4 of known design. The drive of the vehicle wheels, not shown, is by way of an output drive shaft 5. The torque converter 3 consists of a pump 6, a stator 7 which is rigidly secured to converter housing 8 and a turbine 9 which is arranged in the radially inner part of the torque converter 3 so that axial flow takes place through it. The turbine 9 is connected via a turbine shaft 10 and sets 11 and 12 of planet wheels with the output drive shaft 5. The drive from the engine or motor in this case is via the differential gear unit 2, in the form of epicyclic gearing, the input of power taking place via the annulus 2a. The mechanical part of the power is transmitted via the planet wheel carrier 2b to the output shaft 5 and the hydraulic part of the power is transmitted via the solar wheel 2c, a coupling unit 14 and a pump shaft 13 to the pump 6. A differential brake 2d makes it possible for the solar wheel 2c to be halted so that the engine power is then transmitted purely mechanically to the output drive shaft. At the same time however the pump 6 is halted since the coupling unit 14 is normally in the coupled condition during operation. The arrangement of the wheels of the planetary differential gear unit 2 is in fact such that the solar wheel 2c, and thus the pump 6, are also rotated in the opposite direction to the drive shaft 1 and to the output drive shaft 5. The turbine 9 for its part rotates during traction operation in the opposite direction to the pump 6, that is to say via the output gearing transmission 4 and the planet wheel set 11 in the same direction as the output drive shaft 5. The direction of flow in the torque converter at this time is indicated in FIG. 1 by the arrow T.

For braking, a multi-plate brake 12d for the annulus 12a of the planet wheel set 12 is actuated so that the turbine 9 is caused to turn in the opposite direction with the simultaneous transmission of power by way of the planet wheel set 11. The turbine 9 operates in this condition as a pump and produces a circular flow (see arrow B) opposite to the flow during traction operation so that the pump 6 acts as a turbine, it rotating in the direction opposite to that of the turbine and at the same time opposite to the direction of rotation during traction. By controlled decoupling of the coupling unit 14, that is to say by setting a given degree of slip in the coupling unit 14, the pump 6 is caused to commence to rotate. At the radially inner end of the pump vanes there is then a pre-spin leading to a substantial increase in the braking moment due to the turbine 9.

Reference numeral 16 denotes part of the transmission controller, which contains two valves 17 and 18 with which the fluid under pressure by a pump 19, generally the same fluid as is used for operation of the transmission, is passed to the actuating pistons of the differential brake 2d and the coupling unit 14. When a signal for the actuation of the differential brake 2d arrives at the valve 17 (for switching over to the mechanical range of operation) the valve 17 is moved out of its neutral into its working position so that the fluid pressure reaches the actuating piston of the differential brake 2d. At the same time the fluid under pressure flows to the valve 18 which is held in its open setting by a spring so that the actuating piston of the coupling unit 14 is put under pressure. In the present embodiment the internal plates of the coupling unit 14 are connected with the pump. The external plates are located on that part which carries the internal plates of the differential brake 2d. It is in this way that the solar wheel 2c and the pump 6 are simultaneously halted. In response to a "brake" signal from the transmission controller the valve 18 may furthermore be moved into a position in which there is drop in pressure upstream from the actuating piston of the coupling unit 14. In this manner it is possible to cause the pump 6 to be turned in a controlled manner under the action of the torque produced by the flow, as described above. The differential brake 2d remains on during this time. After the end of the braking operation, the valve 18 is moved back into the fully open position so that the pump 6 is halted. It is obviously necessary to release the plate brake 12d again for this purpose.

FIG. 2 shows another way of producing opposite rotation of the pump 6. The structure of the transmission is the same as that of FIG. 1, but in addition there is a coupling device 15 between a coupling device 14a and the output drive shaft 5. This coupling device as well may be a fluid operated plate clutch. The valve 17 is again accommodated in a controller 16a and on operation of the valve 17 fluid under pressure is supplied not only to the differential brake 2d but furthermore to a two-way valve 20, due to which in one of its positions corresponding to traction operation the fluid under pressure flows to the actuating piston for the coupling device 14a. On the arrival of a "brake" signal the valve 20 goes into the other operational position, in which the coupling device 14a is uncoupled and in its place the coupling device 15 is operated. The pump 6 is thus coupled with the output shaft 5, this corresponding to a rotation in the opposite direction to that during traction. Since as noted the pump operates as a turbine, a weak torque is imparted to the output shaft 5. The increase in the braking moment due to the pre-spin at the outlet of the pump 6 caused by the opposite rotation is however considerable even despite the slight reduction caused by the turbine moment of the pump 6. At the end of the braking operation the coupling device is uncoupled again so that the coupling device 14a is caused to transmit torque in its place.

The arrangement of the differential brake 2d, of the coupling device 14a and of the coupling device 15 within the transmission may be in a single plane, that is to say concentric, or they may be axially aligned alongside each other, dependent on the sort of space available in the transmission or required dimensions. The supply of the fluid under pressure to the actuating piston for the coupling device 14a may be either via the shaft of the solar wheel 2c or the pump shaft 13 and furthermore the fluid under pressure for the actuating piston of the coupling device 15 may be supplied from the pump shaft 13 of the output shaft 5. Both the coupling device 14a and also the coupling device 15 are in the present case in the form of plate-coupled elements. In place of this other designs would be possible. Dependent on the type of construction of the transmission, in which the torque converter of the invention is accommodated, it is possible to have other arrangements as well in order to make possible rotation of the pump during braking in a direction opposite to the turbine. It is furthermore possible to use a pressure controlling device to vary the actuating pressure for the coupling device 14a or the coupling device 15 in such a way that the pump may be run at any desired speed by allowing different amounts of slip in the plate units, this meaning that the braking force may be controlled.

Departing from the working examples shown in FIGS. 1 and 2 an arrangement would be possible in which the transmission would be a purely hydrodynamic mechanical transmission without a power splitting differential gear unit 2 between the drive shaft and the torque converter. The pump 6 of the torque converter would then be connected with the drive shaft 1 via a disconnectable coupling, while on the other hand the turbine of the torque converter would be connected via a clutch and reversing drive with the output shaft 5.

During braking operation the pump 6 is uncoupled from the drive shaft 1 and so directly or indirectly coupled with the output shaft via a frictional coupling element capable of slip that there is rotation of the pump at a given speed in a direction opposite to the direction during traction. As in the initially mentioned designs of transmission, it is obviously necessary in the present invention for the turbine as well to have its direction of rotation reversed by the reversing transmission during braking.

We claim:

1. A hydrodynamic mechanical transmission for vehicles including motor vehicles, said transmission comprising:
   an input drive shaft;
   an output drive transmission; and
   a differential gear unit connected to said input drive shaft and said output drive transmission; and
   a hydrodynamic mechanical torque converter connected to said differential gear unit, said torque converter having a housing and including:
   a pump located in said housing and adapted to rotate in response to output from said differential gear unit;
   a stator located in said housing and positioned in communication with said pump, said stator being secured to said housing;
   a turbine located in said housing and positioned in communication with said pump and said stator, said turbine adapted to rotate in response to output from said output transmission, wherein said turbine rotates in a direction opposite to the direction of rotation of said pump during a traction operation; and
   a device for causing reversal of the direction of rotation of said turbine for braking the vehicle, and having an arrangement which during braking causes a controlled rotational motion of said pump of said torque converter which rotation is opposite to the rotation of said pump during traction.

2. The hydrodynamic mechanical transmission as claimed in claim 1, characterized in that the input of said torque converter is connected with a power splitting differential and in that said pump is adapted to be fixedly braked.

3. The hydrodynamic mechanical transmission as claimed in claim 2, characterized by an axial-flow turbine which is so arranged in said torque converter that during traction operation the functional fluid first passes through said pump, then said stator and lastly said turbine.

4. The hydrodynamic mechanical transmission as claimed in claim 3, characterized by a controlled element for retarding the pump when the same rotates in the direction caused by the flow in the torque converter during braking operation.

5. The hydrodynamic mechanical transmission as claimed in claim 4, characterized in that the controlled element for braking the pump is in the form of a pressure fluid operated coupling unit able to allow slip.

6. The hydrodynamic mechanical transmission as claimed in claim 3, characterized in that the pump is adapted to be coupled with the turbine via a mechanical coupling element.

7. The hydrodynamic mechanical transmission as claimed in claim 6, characterized by a coupling device between the pump and a shaft connected with the turbine for initiating opposite rotation of the pump.

8. The hydrodynamic mechanical transmission as claimed in claim 2, characterized by a controlled element for retarding the pump when the same rotates in the direction caused by the flow in the torque converter during braking operation.

9. The hydrodynamic mechanical transmission as claimed in claim 8, characterized in that the controlled element for braking the pump is in the form of a pressure fluid operated coupling unit able to allow slip.

10. The hydrodynamic mechanical transmission as claimed in claim 2, characterized in that the pump is adapted to be coupled with the turbine via a mechanical coupling element.

11. The hydrodynamic mechanical transmission as claimed in claim 10, characterized by a coupling device between the pump and a shaft connected with the turbine for initiating opposite rotation of the pump.

12. The hydrodynamic mechanical transmission as claimed in claim 1, characterized by a controlled element for retarding said pump when the same rotates in the direction caused by the flow in said torque converter during braking operation.

13. The hydrodynamic mechanical transmission as claimed in claim 12, characterized in that the controlled element for braking the pump is in the form of a pressure fluid operated coupling unit which permits slip.

14. The hydrodynamic mechanical transmission as claimed in claim 1, characterized in that said pump is adapted to be coupled with said turbine via a mechanical coupling element.

15. The hydrodynamic mechanical transmission as claimed in claim 14, characterized by a coupling device between said pump and a shaft connected to said turbine for initiating opposite rotation of said pump.

16. The hydrodynamic mechanical transmission as claimed in claim 1, characterized in that during braking operation the opposite rotation of said pump in relation to said turbine is caused by said device which is an epicyclic gearing arrangement.

17. The hydrodynamic mechanical transmission as claimed in claim 1, characterized by a controller causing disconnection of a unit driving said pump during traction operation and causing operation of a coupling device for the opposite direction of rotation of said pump.

18. The hydrodynamic mechanical transmission as claimed in claim 17, characterized in that a solar wheel of a differential transmission is adapted to be braked by means of a differential brake and said unit is arranged on the rotating part of said differential brake.

* * * * *